US012577330B2

(12) United States Patent
Chung et al.

(10) Patent No.: US 12,577,330 B2
(45) Date of Patent: Mar. 17, 2026

(54) SUPER ABSORBENT POLYMER AND PREPARATION METHOD THEREOF

(71) Applicant: LG CHEM, LTD., Seoul (KR)

(72) Inventors: Ui Seok Chung, Daejeon (KR); Yoon Jae Min, Daejeon (KR); Seul Ah Lee, Daejeon (KR); Gicheul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 762 days.

(21) Appl. No.: 17/910,766

(22) PCT Filed: Nov. 10, 2021

(86) PCT No.: PCT/KR2021/016321
§ 371 (c)(1),
(2) Date: Sep. 9, 2022

(87) PCT Pub. No.: WO2022/114610
PCT Pub. Date: Jun. 2, 2022

(65) Prior Publication Data

US 2023/0111749 A1 Apr. 13, 2023

(30) Foreign Application Priority Data

Nov. 27, 2020 (KR) ........................ 10-2020-0162890
Nov. 8, 2021 (KR) ........................ 10-2021-0152460

(51) Int. Cl.
*C08F 20/06* (2006.01)
*B01J 20/26* (2006.01)
*B01J 20/30* (2006.01)
*B01J 20/32* (2006.01)

(52) U.S. Cl.
CPC ............. *C08F 20/06* (2013.01); *B01J 20/267* (2013.01); *B01J 20/3064* (2013.01); *B01J 20/3282* (2013.01); *B01J 2220/68* (2013.01)

(58) Field of Classification Search
CPC ...... C08F 20/06; B01J 20/267; B01J 20/3064; B01J 20/3282
See application file for complete search history.

(56) References Cited

U.S. PATENT DOCUMENTS

| | | | | |
|---|---|---|---|---|
| 2008/0269372 | A1 | 10/2008 | Dairoku et al. | |
| 2012/0001122 | A1 | 1/2012 | Wattebled et al. | |
| 2012/0289607 | A1 | 11/2012 | Xiong et al. | |
| 2017/0014801 | A1 | 1/2017 | Ikeuchi et al. | |
| 2018/0311358 | A1 | 11/2018 | Marchant et al. | |
| 2020/0188876 | A1 * | 6/2020 | Kim | B01J 20/28085 |
| 2021/0023529 | A1 | 1/2021 | Lee et al. | |
| 2021/0094017 | A1 | 4/2021 | Choi et al. | |
| 2023/0241582 | A1 * | 8/2023 | Park | C08K 5/11 252/194 |

FOREIGN PATENT DOCUMENTS

| | | | | |
|---|---|---|---|---|
| CN | 107384674 | A | 11/2017 | |
| CN | 108473652 | A | 8/2018 | |
| CN | 111819230 | A | 10/2020 | |
| EP | 0897304 | A1 | 2/1999 | |
| EP | 3907253 | A1 | 11/2021 | |
| JP | H08-157606 | A | 6/1996 | |
| JP | 5649336 | B2 | 1/2015 | |
| JP | 2017-206646 | A | 11/2017 | |
| KR | 10-2007-0004669 | A | 1/2007 | |
| KR | 10-0843607 | B1 | 7/2008 | |
| KR | 10-2012-0043165 | A | 5/2012 | |
| KR | 2016-0081533 | A | 7/2016 | |
| KR | 2016-0127742 | A | 11/2016 | |
| KR | 10-2020-0071032 | A | 6/2020 | |
| KR | 10-2020-0075605 | A | 6/2020 | |
| KR | 10-2020-0087616 | A | 7/2020 | |
| WO | WO-9738740 | A1 * | 10/1997 | A61L 28/0026 |
| WO | 2011/038374 | A2 | 3/2011 | |
| WO | 2020/145533 | A1 | 7/2020 | |
| WO | 2021-125559 | A1 | 6/2021 | |

OTHER PUBLICATIONS

International Search Report (with translation) and Written Opinion dated Mar. 2, 2022, issued in corresponding International Patent Application No. PCT/KR2021/016321.
J. Wu et al., "Influence of the COOH and COONa groups and crosslink density of poly(acrylic acid)/ montmorillonite superabsorbent composite on water absorbency," Polymer International, 2001, vol. 50, pp. 1050-1053.
G. Odian, "Principles of Polymerization, Second Edition," A Wiley-Interscience Publication, 1981, p. 203.
R. Schwalm, "UV Coatings Basics, Recent Developments and New Applications," Elsevier Science, 2006, p. 115.
Extended European Search Report dated Jun. 27, 2023 issued in the European Patent Application No. 21898436.7.
Office Action dated Dec. 20, 2024 issued with corresponding Chinese Patent Application No. 202180015090.X.
Office Action dated Jan. 14, 2025 issued with corresponding Korean Patent Application No. 10-2021-0152460.

* cited by examiner

*Primary Examiner* — Yong L Chu
(74) *Attorney, Agent, or Firm* — Morgan, Lewis & Bockius LLP

(57) ABSTRACT

The present disclosure relates to a super absorbent polymer and a preparation method of the same. More specifically, it relates to a super absorbent polymer having a reduced extractable content without deterioration in absorption performance, and to a preparation method of the super absorbent polymer capable of producing the above-described super absorbent polymer by performing a polymerization reaction in the presence of a foaming agent and a carboxylic acid-based additive having a specific structure.

15 Claims, No Drawings

SUPER ABSORBENT POLYMER AND PREPARATION METHOD THEREOF

CROSS-REFERENCE TO RELATED APPLICATION(S)

This application claims the benefit of Korean Patent Applications No. 10-2020-0162890 filed on Nov. 27, 2020 and No. 10-2021-0152460 filed on Nov. 8, 2021 with the Korean Intellectual Property Office, the disclosures of which are incorporated herein by reference in their entirety.

TECHNICAL FIELD

The present disclosure relates to a super absorbent polymer and a preparation method of the same. More specifically, it relates to a super absorbent polymer having a reduced extractable content without deterioration in absorption performance, and to a preparation method of the super absorbent polymer capable of producing the above-described super absorbent polymer.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to more efficiently absorb a large amount of liquid such as urine, it is necessary for the super absorbent polymer to exhibit high absorption performance as well as fast absorption rate. Further, the super absorbent polymer should not release the absorbed liquid even under external pressure, and additionally it should well retain the shape even in a state where the volume is expanded (swelled) by absorbing liquid, thereby exhibiting excellent permeability.

The super absorbent polymer includes a plurality of hydrophilic moieties on its surface in order to exhibit high absorption properties for liquids, specifically water. Therefore, when exposed to air, agglomeration and caking between the super absorbent polymer particles have occurred by absorbing moisture contained in the air.

Accordingly, there is a continuous demand for the development of a super absorbent polymer having improved permeability without reducing the absorption rate while preventing the caking phenomenon between super absorbent polymer particles, in addition to the improvement of centrifuge retention capacity (CRC) and absorbency under pressure (AUP), which are physical properties indicating basic absorbency and water retention capacity of the super absorbent polymer.

DETAILED DESCRIPTION OF THE INVENTION

Technical Problem

Accordingly, the present disclosure relates to a preparation method of a super absorbent polymer with improved permeability and anti-caking efficiency while having a high absorption rate by polymerizing a monomer in the presence of an encapsulated foaming agent, and adding an additive having a specific structure to the hydrogel polymer, followed by coarse pulverization.

Technical Solution

In order to solve the above problems, according to one embodiment of the present disclosure, there is provided a super absorbent polymer including super absorbent polymer particles comprising a cross-linked polymer of a water-soluble ethylene-based unsaturated monomer having at least partially neutralized acidic groups and an internal cross-linking agent; and a carboxylic acid-based additive, wherein the carboxylic acid-based additive is at least one selected from the group consisting of a carboxylic acid represented by the following Chemical Formula 1 and a salt thereof, and the super absorbent polymer satisfies the following physical properties of 1) an extractable content measured after swelling the super absorbent polymer for 1 hour according to EDANA WSP 270.2 is 4 wt % or less based on a total weight of the super absorbent polymer; and 2) BPI (Base Polymer Index) calculated according to the following Equation 1 is 31 or more:

[Chemical Formula 1]

$$A \text{—}(B_1\text{—}B_2)_n\text{—} C$$

in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH=CH—, or —C wherein $R_1$ and $R_2$ are each independently C1 to C4 alkyl, n is an integer of 1 to 3, and C is a carboxyl group, $$BPI = \frac{CRC + 8.7585}{\ln\text{ (extractable content)}} \quad \text{[Equation 1]}$$

in Equation 1,

CRC is centrifuge retention capacity measured according to the EDANA WSP 241.3, and In (extractable content) is a natural log value of the extractable content.

In addition, there is provided a preparation method of a super absorbent polymer including a step of forming a hydrogel polymer by cross-linking polymerization of a water-soluble ethylene-based unsaturated monomer having at least partially neutralized acidic groups in the presence of an internal cross-linking agent, an encapsulated foaming agent, a carboxylic acid-based additive and a polymerization initiator (Step 1); and a step of drying and pulverizing the hydrogel polymer (Step 2), wherein the carboxylic acid-based additive is at least one selected from the group consisting of a carboxylic acid represented by the Chemical Formula 1 and a salt thereof.

Advantageous Effects

According to the super absorbent polymer and the preparation method thereof of the present disclosure, the extractable content can be reduced without deterioration in absorption performance of the super absorbent polymer by including a carboxylic acid-based additive having a specific structure. In addition, such a carboxylic acid-based additive may be added together with a foaming agent in the polymerization step to significantly reduce surface tackiness of the hydrogel polymer. Accordingly, tearing of the polymer is prevented in the chopping step of the hydrogel polymer, so that the extractable content of the finally prepared super absorbent polymer is reduced and the absorption performance may not be deteriorated.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the preparation method of a super absorbent polymer and the super absorbent polymer will be described in more detail according to specific embodiments of the present invention.

The terminologies are used merely to refer to specific embodiments, and are not intended to restrict the present disclosure unless it is explicitly expressed. Singular expressions of the present disclosure may include plural expressions unless they are differently expressed contextually.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 30 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which a water-soluble ethylene-based unsaturated monomer having at least partially neutralized acidic groups is polymerized and cross-linked by an internal cross-linking agent.

In addition, the terminology "super absorbent polymer" is used to encompass all of a cross-linked polymer in which a water-soluble ethylene-based unsaturated monomer having at least partially neutralized acidic groups is polymerized or a base resin in the form of powder consisting of super absorbent polymer particles in which the cross-linked polymer is pulverized, and the cross-linked polymer or the base resin further processed, for example, drying, pulverization, classification, surface cross-linking, etc., to be in a state suitable for commercialization, depending on the context. Accordingly, the terminology "super absorbent polymer" may be interpreted as encompassing a composition including a super absorbent polymer, that is, a plurality of super absorbent polymer particles.

In addition, the terminology "normal super absorbent polymer particles" refers to particles having a particle diameter of 150 μm to 850 μM among super absorbent polymer particles.

In addition, the terminology "fine powder" refers to particles having a particle diameter of less than 150 μM among super absorbent polymer particles.

In addition, the terminology "chopping" refers to cutting the hydrogel polymer into small pieces to increase drying efficiency, and is used separately from pulverization to a normal particle size.

Super absorbent polymers are conventionally prepared by drying a hydrogel polymer obtained by polymerizing monomers and then pulverizing it to a desired particle size. At this time, in order to facilitate drying of the hydrogel polymer and increase an efficiency of the pulverization process, a process of chopping or cutting the hydrogel polymer is performed before the drying process. However, since the surface of the generally prepared hydrogel polymer is sticky, it is difficult to perform the chopping to a uniform size, so that there has been a problem that the efficiency of chopping is reduced and tearing of the polymer occurs in the chopping step. In particular, in order to improve the absorption rate by increasing the specific surface area of the super absorbent polymer, a foaming agent was used together during polymerization. In this case, since the light was not sufficiently irradiated to the inside of the monomer composition by the foaming agent, the tackiness of the hydrogel polymer was increased due to some of the monomer that did not undergo polymerization, which became a further problem.

Moreover, the polymer adhered to a part of the polymerizer belt due to the surface tackiness of the hydrogel polymer, and accordingly, polymerization occurred unevenly due to the residue remaining on the part of the polymerizer belt, which also caused a problem that the polymerizer had to be maintained more frequently.

In the case of the super absorbent polymer produced with the tearing of the polymer in the chopping step, the polymer structure of some cross-linked polymers could not be maintained after polymerization, so that the extractable content of the final super absorbent polymer was increased, and general physical properties such as water retention capacity could also be lowered.

Accordingly, the present inventors have completed the present invention by confirming that when a carboxylic acid-based additive having a specific structure is included, the extractable content can be reduced without deterioration in the absorption performance of the super absorbent polymer. In particular, when the carboxylic acid-based additive is added together with a foaming agent in the polymerization step, the carboxylic acid-based additive is adsorbed to the inside and/or surface of the polymerized hydrogel polymer without participating in the polymerization reaction, and the carboxylic acid-based additive adsorbed on the surface may impart hydrophobicity to the surface of the hydrogel polymer. Accordingly, the surface tackiness of the hydrogel polymer can be significantly reduced, and tearing of the polymer in the chopping step is prevented, so that the extractable content of the final super absorbent polymer is reduced without deterioration in absorption performance.

Herein, the carboxylic acid-based additive added to the hydrogel polymer is at least one compound selected from the group consisting of the carboxylic acid represented by the Chemical Formula 1 and a salt thereof, and has a hydrophobic functional group and a hydrophilic functional group at the same time. Meanwhile, since the water-soluble ethylene-based unsaturated monomer contains an acidic group (—COOH) and/or a neutralized acidic group ($—COO^-$), a large amount of hydrophilic moiety is present on a surface of the hydrogel polymer prepared by polymerization due to the acidic group (—COOH) and/or the neutralized acidic group ($-COO^-$) remaining without participating in polymerization. Therefore, a hydrophilic functional group of the additive is adsorbed to at least some part of the hydrophilic moiety present on the surface of the hydrogel polymer, and the surface of the polymer to which the additive is adsorbed becomes hydrophobic by a hydrophobic functional group located at the other end of the additive. Accordingly, the surface of the hydrogel polymer may exhibit hydrophobicity, thereby reducing the surface tackiness.

More specifically, in the carboxylic acid-based additive, the hydrophobic functional group is a C5 to C21 alkyl group (part A), and the hydrophilic functional group is part C, specifically, a carboxyl group (COOH) or a carboxylate group ($—COO^-$) in the case of a salt. The hydrophobic functional group and the hydrophilic functional group are respectively located at both ends of the additive. In particular, the carboxylic acid-based additive further includes part ($B_1$-$B_2$) in addition to part A and part C at both ends, and the part ($B_1$-$B_2$) improves adsorption performance with respect to the polymer surface, which may be insufficient only with the part C. Accordingly, the additive having the structure of Chemical Formula 1 has excellent adsorption performance with respect to the polymer surface exhibiting hydrophilicity compared to the compound having an A-C structure without the part ($B_1$-$B_2$).

Further, the compound having an A-C structure without the part ($B_1$-$B_2$) does not exhibit hydrophilicity enough to be dissolved in the monomer composition in which the solvent is water, and thus cannot be added to the monomer composition.

Hereinafter, the super absorbent polymer and the preparation method of the same according to an exemplary embodiment will be described in more detail.

Super Absorbent Polymer

According to one embodiment of the present disclosure, there is provided a super absorbent polymer including super absorbent polymer particles comprising a cross-linked polymer of a water-soluble ethylene-based unsaturated monomer having at least partially neutralized acidic groups and an internal cross-linking agent; and a carboxylic acid-based additive, wherein the carboxylic acid-based additive is at least one selected from the group consisting of a carboxylic acid represented by the Chemical Formula 1 and a salt thereof, and the super absorbent polymer satisfies the following physical properties of 1) an extractable content measured after swelling the super absorbent polymer for 1 hour according to EDANA WSP 270.2 is 4 wt % or less based on a total weight of the super absorbent polymer; and
2) BPI (Base Polymer Index) calculated according to the Equation 1 is 31 or more.

The super absorbent polymer includes a plurality of super absorbent polymer particles including a cross-linked polymer of a water-soluble ethylene-based unsaturated monomer having at least partially neutralized acidic groups and an internal cross-linking agent. Herein, the cross-linked polymer is obtained by cross-linking polymerization of a water-soluble ethylene-based unsaturated monomer having at least partially neutralized acidic groups in the presence of an internal cross-linking agent, and may have a three-dimensional network structure in which main chains formed by polymerization of monomers are cross-linked by the internal cross-linking agent.

In other words, the super absorbent polymer of one embodiment includes a plurality of super absorbent polymer particles including a cross-linked polymer of a water-soluble ethylene-based unsaturated monomer having at least partially neutralized acidic groups and an internal cross-linking agent. When the cross-linked polymer has a three-dimensional network structure in which main chains formed by polymerization of the monomers are cross-linked by the internal cross-linking agent, water retention capacity and absorbency under pressure, which are general physical properties of the super absorbent polymer, can be significantly improved compared to a case having a two-dimensional linear structure that is not further cross-linked by an internal cross-linking agent.

In addition, the super absorbent polymer satisfies the following physical properties of 1) and 2):

1) An extractable content measured after swelling the super absorbent polymer for 1 hour according to EDANA WSP 270.2 is 4 wt % or less based on a total weight of the super absorbent polymer; and
2) BPI (Base Polymer Index) calculated according to the following Equation 1 is 31 or more.

Herein, the "extractable content" of the super absorbent polymer refers to a compound in the form of a polymer that is not cross-linked during the preparation of the super absorbent polymer, and may be generated by incomplete cross-linking during polymerization, which may result in non-cross-linking, or by decomposition of a cross-linking agent or breakage of main molecular chains during chopping or drying. This extractable content is problematic, because it can be easily eluted when the super absorbent polymer absorbs liquid and swells. Therefore, when the extractable content of the super absorbent polymer exceeds 4 wt % based on a total weight of the super absorbent polymer, the super absorbent polymer is eluted, causing a problem such as making the surface of hygiene products to be applied sticky or damaging the skin. More specifically, the extractable content of the super absorbent polymer may be 4 wt % or less, 3.8 wt % or less, 3.6 wt % or less, 3.5 wt % or less, or 3.4 wt % or less based on a total weight of the super absorbent polymer. In addition, as the lower extractable content can be evaluated as the better, the lower limit is theoretically 0 wt %, but may be 1 wt % or more, 2 wt % or more, or 3 wt % or more.

In addition, the super absorbent polymer may have centrifuge retention capacity (CRC) of 30 g/g or more, 32 g/g or more, 33 g/g or more, or 34 g/g or more, and 40 g/g or less, 38 g/g or less, or 36 g/g or less, when measured in accordance with the EDANA WSP 241.3.

In addition, the super absorbent polymer has a base polymer index (BPI) of 31 or more, when calculated according to the Equation 1. When the BPI value is less than 31, the extractable content is high even with the same level of water retention capacity, so that there may be a problem in that the strength is lowered due to a weak network of the cross-linked polymer in the super absorbent polymer. In addition, as a rewet phenomenon increases, hygiene and safety are unsatisfactory. More specifically, BPI of the super absorbent polymer may be 32 or more, 33 or more, 34 or more, 35 or more, or 36 or more. In addition, as the higher BPI can be evaluated as the better, there is no upper limit. For example, the upper limit may be 45 or less, 43 or less, 40 or less, or 38 or less.

The water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 2:

R—COOM' [Chemical Formula 2]

in Chemical Formula 2,

R is a C2 to C5 alkyl group having an unsaturated bond, and

M' is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt of the acid.

When (meth)acrylic acid and/or a salt thereof is used as a water-soluble ethylene-based unsaturated monomer, it is advantageous to obtain a super absorbent polymer having improved absorption performance. In addition, maleic anhydride, fumaric acid, crotonic acid, itaconic acid, 2-acryloylethane sulfonic acid, 2-methacryloylethanesulfonic acid, 2-(meth)acryloylpropanesulfonic acid, 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth)acrylamide, or the like may be used as the monomer.

Herein, the water-soluble ethylene-based unsaturated monomer may have acidic groups, and at least some of the acidic groups may be neutralized by a neutralizing agent. Specifically, in the step of mixing the water-soluble ethylene-based unsaturated monomer having acidic groups, the internal cross-linking agent, the polymerization initiator and the neutralizing agent, at least some of the acidic groups of the water-soluble ethylene-based unsaturated monomer may be neutralized. In this case, a basic substance such as sodium hydroxide, potassium hydroxide, and ammonium hydroxide capable of neutralizing acidic groups may be used as the neutralizing agent.

In addition, a degree of neutralization of the water-soluble ethylene-based unsaturated monomer may be 50 to 90 mol %, 60 to 85 mol %, 65 to 85 mol %, or 65 to 75 mol %, wherein the degree of neutralization refers to the degree to which the acidic groups contained in the water-soluble ethylene-based unsaturated monomer are neutralized by the neutralizing agent. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds regardless of the surface or the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the water-soluble ethylene-based unsaturated monomer. As a non-limiting example, the internal cross-linking agent may be a multifunctional cross-linking agent. For example, it may be acrylate-based compounds such as N,N'-methylenebisacrylamide, trimethylpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, and pentaerythritol tetraacrylate; epoxy compounds such as ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, and polyglycerol polyglycidyl ether; triarylamine; propylene glycol; glycerin; or ethylene carbonate, and theses may be used alone or in combination of two or more. However, the present disclosure is not limited thereto.

According to one embodiment, the epoxy-based compound may be used as the internal cross-linking agent. For example, ethylene glycol diglycidyl ether may be used as the internal cross-linking agent. In this case, unlike the case where only an acrylate-based compound such as polyethylene glycol di(meth)acrylate is used as an internal cross-linking agent, polymerization is not performed in-situ, and the reaction proceeds slowly, resulting in a low degree of cross-linking. Therefore, the hydrogel polymer prepared using an epoxy-based compound as an internal cross-linking agent has severe surface tackiness compared to a hydrogel polymer prepared using an acrylate-based compound such as polyethylene glycol di(meth)acrylate as an internal cross-linking agent. In addition, the extractable content of the super absorbent polymer to be finally prepared by such a polymer may be high. However, in the case of the super absorbent polymer including the above-described carboxylic acid-based additive, even if an epoxy-based compound is used as an internal cross-linking agent, the surface tackiness of the polymer can be reduced.

In this case, an acrylate-based compound such as polyethylene glycol di(meth)acrylate may be used together with the epoxy-based compound as the internal cross-linking agent.

The cross-linking polymerization of the water-soluble ethylene-based unsaturated monomer in the presence of the internal cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In addition, the super absorbent polymer particles may have a particle diameter of about 150 to about 850 μm, and the particle diameter may be measured in accordance with the EDANA (European Disposables and Nonwovens Association) WSP 220.3.

In addition, the super absorbent polymer includes the carboxylic acid-based additive. As described above, the additive is mixed with the hydrogel polymer and added so that pulverization of the hydrogel polymer can be easily performed without agglomeration. At this time, the carboxylic acid-based additive is at least one selected from the group consisting of a carboxylic acid represented by the Chemical Formula 1 and a metal salt thereof. Specifically, the carboxylic acid-based additive is at least one selected from the group consisting of a carboxylic acid represented by the Chemical Formula 1, an alkali metal salt of a carboxylic acid represented by the Chemical Formula 1, and an alkaline earth metal salt of a carboxylic acid represented by the Chemical Formula 1. More specifically, the carboxylic acid-based additive is one of a carboxylic acid represented by the Chemical Formula 1, an alkali metal salt of a carboxylic acid represented by the Chemical Formula 1, and an alkaline earth metal salt of a carboxylic acid represented by the Chemical Formula 1.

In the Chemical Formula 1, A is a hydrophobic moiety and may be a C5 to C21 linear or branched alkyl group. However, the case where A is a linear alkyl group is more advantageous in terms of suppressing agglomeration of pulverized particles and improving dispersibility. When A is an alkyl group having less than 5 carbon atoms, there is a problem in that the chain is short, so that the agglomeration of pulverized particles cannot be effectively controlled. When A is an alkyl group having more than 21 carbon atoms, mobility of the additive may be reduced, so that the carboxylic acid-based additive may not be effectively mixed with the hydrogel polymer and the cost of the composition may increase due to an increase in the cost of the additive.

Specifically, in the Chemical Formula 1, A may be C5 to C21 linear alkyl such as n-pentyl, n-hexyl, n-heptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, n-octadecanyl, n-nonadecanyl, n-icosanyl, or n-heneicosanyl.

More specifically, A may be C6 to C18 linear alkyl. For example, A may be $-C_6H_{13}$, $-C_{11}H_{23}$, $-C_{12}H_{25}$, $-C_{17}H_{35}$, or $-C_{18}H_{37}$.

In addition, part ($B_1$-$B_2$) of the Chemical Formula 1 improves adsorption performance with respect to the polymer surface, which may be insufficient only with the part C. When the number of carbon atoms of $B_2$ is 3 or more, the distance between part $B_1$ and part C increases, and the adsorption performance with respect to the hydrogel polymer may be deteriorated.

Herein, $R_1$ and $R_2$ may each independently be C1 to C4 linear or branched alkyl. More specifically, $R_1$ and $R_2$ may each independently be methyl, ethyl, propyl, isopropyl, butyl, isobutyl, sec-butyl, or tert-butyl. Since the additive can be adsorbed on the super absorbent polymer particles, it is advantageous that the molecular structure of the additive is not bulky, and thus both $R_1$ and $R_2$ may be methyl.

In addition, n of the Chemical Formula 1 may be 1, 2, or 3. More specifically, n, which means the number of ($B_1$-$B_2$), is preferably 1, considering that the part ($B_1$-$B_2$) is for reinforcing adsorption performance with respect to part C and how long a molecular length is required in order for the carboxylic acid-based additive to be effectively adsorbed on the hydrogel polymer.

Specifically, in the Chemical Formula 1, $B_1$ may be

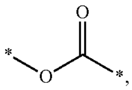,
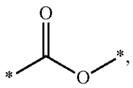, or
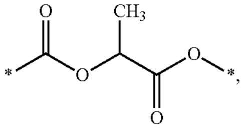, wherein * is a bonding site with a neighboring atom.

For example, $B_1$ may be

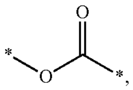, or
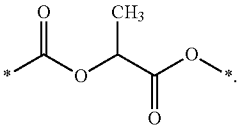.

In addition, in the Chemical Formula 1, $B_2$ may be

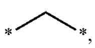,
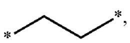,
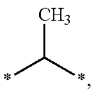,
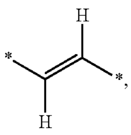,
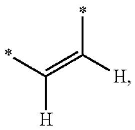 or
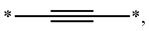, wherein * is a bonding site with a neighboring atom.

At this time, in order to improve adsorption performance of the additive with respect to the cross-linked polymer together with part C, $B_2$ is preferably

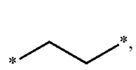, 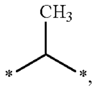, or 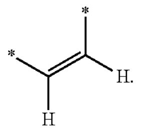.

In addition, in the Chemical Formula 1, part C is a carboxyl group (COON) as a hydrophilic moiety, and when the carboxylic acid-based additive is a salt, the hydrophilic moiety is a carboxylate group ($COO^-$).

In other words, the carboxylic acid-based additive may be a compound represented by the following Chemical Formula 1a:

[Chemical Formula 1a]

$$\left[A-\left(B_1-B_2\right)_n-COO^-\right]_k M$$

in Chemical Formula 1a,

M is $H^+$, a monovalent cation of an alkali metal, or a divalent cation of an alkaline earth metal, k is 1 if M is $H^+$ or a monovalent cation of an alkali metal, and 2 if it is a divalent cation of an alkaline earth metal, and descriptions of A, $B_1$, $B_2$ and n are as defined in the Chemical Formula 1.

More specifically, when the carboxylic acid-based additive is an alkali metal salt of the carboxylic acid represented by the Chemical Formula 1, the additive may be represented by the following Chemical Formula 1':

[Chemical Formula 1']

$$A-\left(B_1-B_2\right)_n-COO^-M_1^+$$

in Chemical Formula 1', $M_1$ is an alkali metal such as sodium or potassium, and descriptions of A, $B_1$, $B_2$ and n are as defined in the Chemical Formula 1.

In addition, when the carboxylic acid-based additive is an alkaline earth metal salt of the carboxylic acid represented by the Chemical Formula 1, the additive may be represented by the following Chemical Formula 1":

[Chemical Formula 1"]

$$\left[A-\left(B_1-B_2\right)_n-COO^-\right]_2 M_2^{2+}$$

in Chemical Formula 1", $M_2$ is an alkaline earth metal such as calcium, and descriptions of A, $B_1$, $B_2$ and n are as defined in the Chemical Formula 1.

For example, the carboxylic acid-based additive may be any one carboxylic acid selected from the group consisting of:

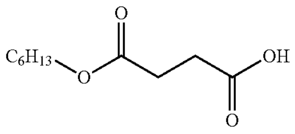

-continued

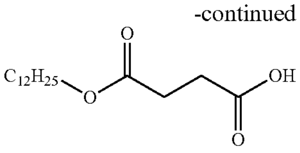

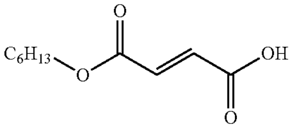

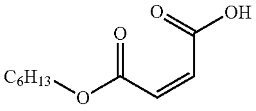

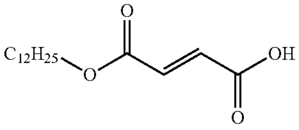

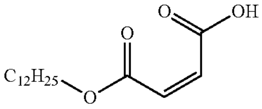

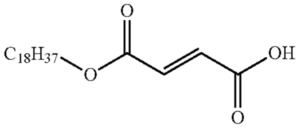

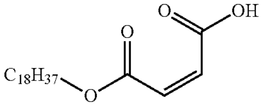

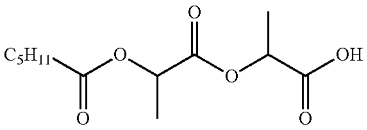

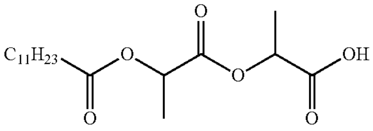

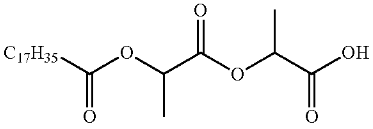

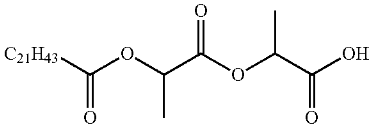

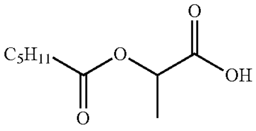

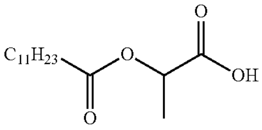

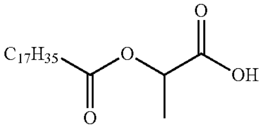

-continued
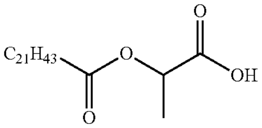
Alternatively, the carboxylic acid-based additive may be any one alkali metal salt selected from the group consisting of:
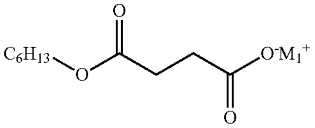
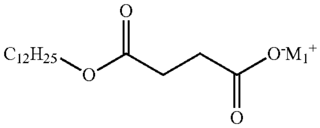
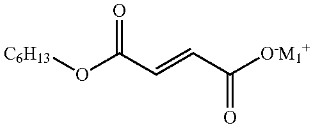
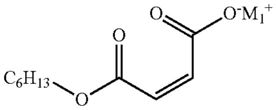
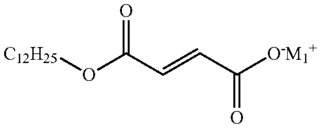
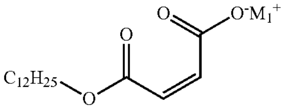
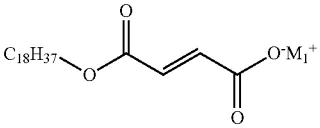
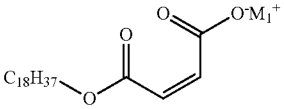
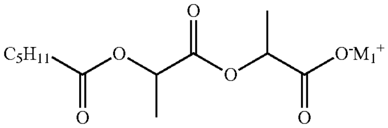
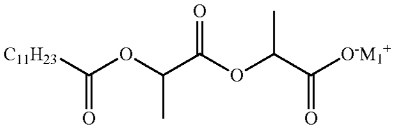
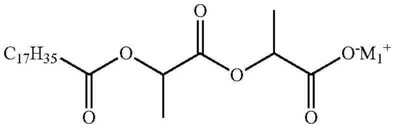
-continued
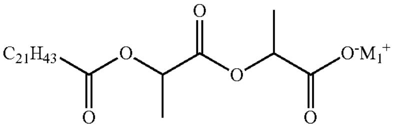
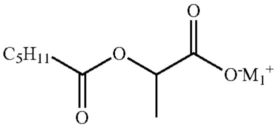
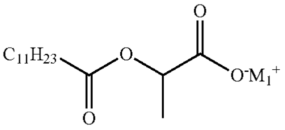
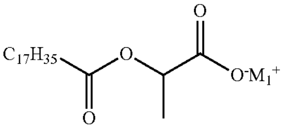
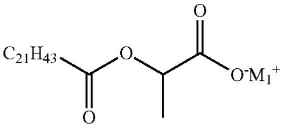
In the above,
$M_1$ is each independently an alkali metal.
Alternatively, the carboxylic acid-based additive may be any one alkaline earth metal salt selected from the group consisting of:
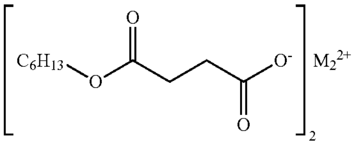
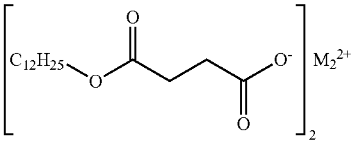
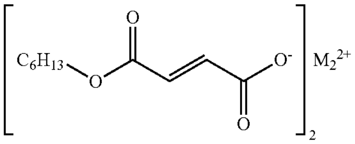
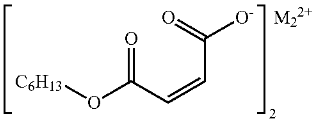
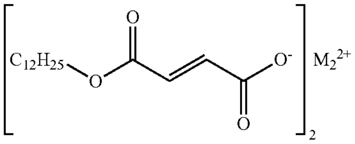
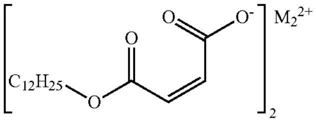

-continued

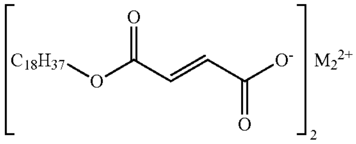

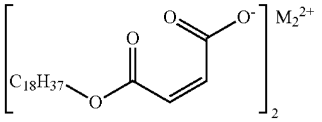

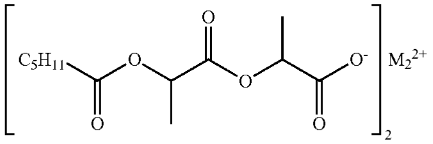

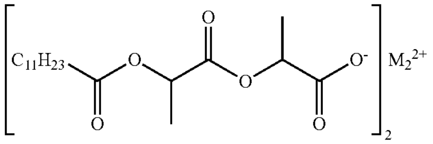

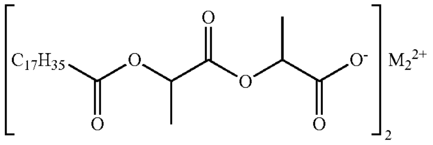

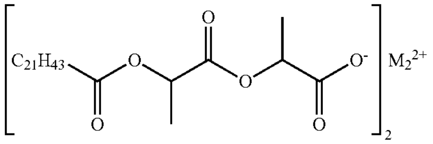

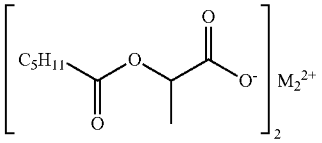

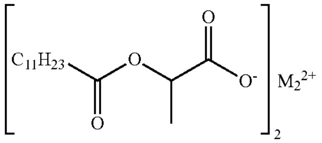

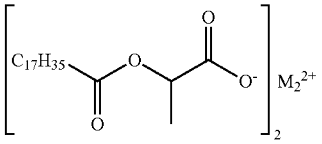

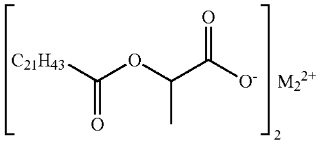

In the above,

M2 is each independently an alkaline earth metal.

For example, the carboxylic acid-based additive may be any one of compounds represented by the following Chemical Formulae 1-1 to 1-7, but is not limited thereto:

1-1

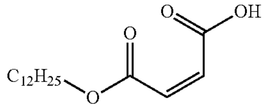

1-2

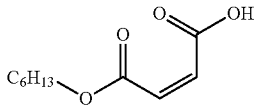

1-3

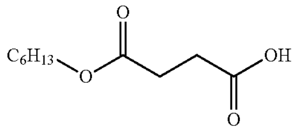

1-4

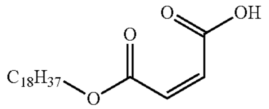

1-5

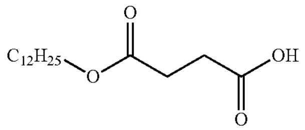

1-6

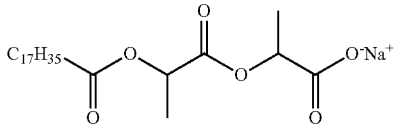

1-7

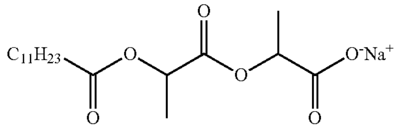

In addition, the super absorbent polymer may further include a compound formed by decomposing an ester bond of $B_1$ in the process of drying after the additive is pulverized with the hydrogel polymer, in addition to the carboxylic acid-based additive.

Specifically, when the additive is a compound in which n is 1 and $B_1$ is —OCC—, the super absorbent polymer may further include an alcohol having an A-OH structure and a compound having a HOOC—$B_2$—C structure.

In addition, when the additive is a compound in which n is 1 and $B_1$ is —COO—, the super absorbent polymer may further include a carboxylic acid having an A-COOH structure and a compound having a HO—$B_2$—C structure.

In addition, when the additive is a compound in which n is 1 and $B_1$ is —COOCH($R_1$)COO—, the super absorbent polymer may further include a carboxylic acid having an A-COOH structure and a compound having a HOCH($R_1$)COO—$B_2$—C structure.

As the super absorbent polymer further includes the compound formed by decomposing an ester bond in the additive molecule, mobility of the additives is increased, and a phenomenon of re-agglomeration after pulverization can be further prevented.

In this case, the carboxylic acid-based additive may be included in an amount of 0.01 to 10 wt % based on a total weight of the super absorbent polymer. Specifically, the super absorbent polymer having the extractable content and BPI as described above can be implemented when 0.01 to 10 parts by weight of the carboxylic acid-based additive is added based on 100 parts by weight of the water-soluble ethylene-based unsaturated monomer in the preparation of the cross-linked polymer. More specifically, when the content of the additive in the super absorbent polymer is too low, the effect of controlling agglomeration by the additive is not sufficient and super absorbent polymer particles that have not been pulverized to a desired particle size may be included. When the content of the additive is excessively high, water retention capacity and absorbency under pressure, which are general physical properties of the super absorbent polymer, may be deteriorated.

The content of the additive in the super absorbent polymer may be determined by analyzing the content of the additive dissolved in the solution part after adding 1 g of the super absorbent polymer to 1 ml of distilled water, then sufficiently mixing for 1 hour until swelling, then filtering to extract only the solution part, and then performing HPLC analysis.

More specifically, the carboxylic acid-based additive may be included in an amount of 0.01 wt % or more, 0.02 wt % or more, 0.05 wt % or more, 0.1 wt % or more, or 0.5 wt % or more, and 10 wt % or less, 8 wt % or less, 5 wt % or less, 3 wt % or less, 2 wt % or less, or 1 wt % or less based on the total weight of the super absorbent polymer.

Meanwhile, when the super absorbent polymer does not further include a surface cross-linked layer, which will be described later, additives other than a plurality of the super absorbent polymer particles, the carboxylic acid-based additive, and the hydrolyzate of the additive produced by hydrolysis of the additive in the preparation of the super absorbent polymer may not be included.

Specifically, the super absorbent polymer of one embodiment may not include a compound having a glucose unit containing a plurality of hydroxyl groups in the molecule such as microcrystalline cellulose. For example, when the super absorbent polymer includes microcrystalline cellulose having an average particle diameter of 1 to 10 μm such as AVICEL® PH-101 represented by the following Chemical Formula 3 available from FMC, agglomeration between the super absorbent polymer particles may not be suppressed due to the plurality of hydroxyl groups, and thus the effect by the above-described additive may not be effectively expressed.

[Chemical Formula 3]

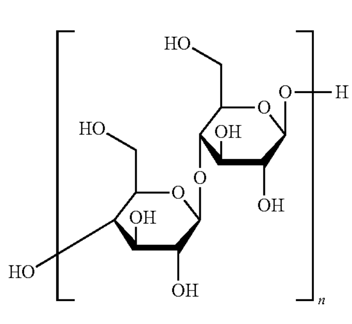

In addition, the super absorbent polymer of one embodiment may not include a hydrophilic additive such as polyethylene glycol, polypropylene glycol, poly(ethylene glycol)-poly(propylene glycol) copolymer, polyoxyethylene lauryl ether carboxylic acid, sodium polyoxyethylene lauryl ether carboxylate, lauryl sulfate, sodium lauryl sulfate, and the like. Since such additives do not have part ($B_1$-$B_2$) of Chemical Formula 1 in the molecule, they cannot be sufficiently adsorbed to the surface of the cross-linked polymer, so that agglomeration between the super absorbent polymer particles may not be effectively suppressed. Accordingly, when the super absorbent polymer includes the hydrophilic additive as described above instead of the carboxylic acid-based additive, agglomeration between the particles is not suppressed after pulverizing the cross-linked polymer, so that the super absorbent polymer contains a large amount of fine powder and has low water retention capacity and low apparent density.

Meanwhile, the super absorbent polymer may further include a surface cross-linked layer formed by further cross-linking the cross-linked polymer using a surface cross-linking agent on at least a part of the surface of the super absorbent polymer particles. This is to increase the surface cross-linking density of the super absorbent polymer particles. As described above, when the super absorbent polymer particles further include a surface cross-linked layer, they have a structure having a higher cross-linking density on the outside than on the inside.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like.

Specifically, one or more, two or more, or three or more of the above-mentioned surface cross-linking agents may be used as the surface cross-linking agent, for example, ethylene carbonate-propylene carbonate (ECPC), propylene glycol and/or glycerol carbonate may be used.

Preparation Method of Super Absorbent Polymer

In addition, according to another embodiment, there is provided a preparation method of a super absorbent polymer including

- a step of forming a hydrogel polymer by cross-linking polymerization of a water-soluble ethylene-based unsaturated monomer having at least partially neutralized acidic groups in the presence of an internal cross-linking agent, a foaming agent, a carboxylic acid-based additive and a polymerization initiator (Step 1); and
- a step of drying and pulverizing the hydrogel polymer (Step 2),
- wherein the carboxylic acid-based additive is at least one selected from the group consisting of a carboxylic acid represented by the Chemical Formula 1 and a salt thereof.

(Step 1)

The above step is to form a hydrogel polymer by cross-linking polymerization of a water-soluble ethylene-based unsaturated monomer having at least partially neutralized acidic groups in the presence of an internal cross-linking agent, a foaming agent, a carboxylic acid-based additive and a polymerization initiator. The step may include a step of preparing a monomer composition by mixing the water-soluble ethylene-based unsaturated monomer, foaming agent, carboxylic acid-based additive, internal cross-linking agent and polymerization initiator, and a step of forming a hydrogel polymer by thermal polymerization or photopolymerization of the monomer composition. In this case, the description of each component may refer to the above description.

In the monomer composition, the internal cross-linking agent may be used in an amount of 0.01 to 5 parts by weight based on 100 parts by weight of the water-soluble ethylene-based unsaturated monomer. For example, the internal cross-linking agent may be used in an amount of 0.01 parts by weight or more, 0.05 parts by weight or more, or 0.1 parts by weight or more, and 5 parts by weight or less, 3 parts by weight or less, or 2.5 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the polymerization initiator may be properly selected depending on the polymerization method. In the case of a thermal polymerization, a thermal polymerization initiator is used, and in the case of a photopolymerization, a photopolymerization initiator is used. Further, in the case of a hybrid polymerization method (a method using both heat and light), all of the thermal polymerization initiator and the photopolymerization initiator can be used. However, even by the photopolymerization method, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, specific examples of the acyl phosphine include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate ((NI-14)25208), and the like may be used as examples of the persulfate-based initiators; and 2,2-azobis(2-amidinopropane) dihydrochloride, 2,2-azobis-(N,N-dimethylene)isobutyram idine dihydrochloride, 2-(carbamoylazo)isobutylonitril, 2,2-azobis[2-(2-imidazolin-2-yl)propane] dihydrochloride, 4,4-azobis-(4-cyanovaleric acid), and the like may be used as examples of the azo-based initiators. More various thermal polymerization initiators are well disclosed in 'Principle of Polymerization (Wiley, 1981)' written by Odian, p 203, and the present disclosure is not limited thereto.

The polymerization initiator may be used in an amount of 2 parts by weight or less based on 100 parts by weight of the water-soluble ethylene-based unsaturated monomer. When the concentration of the polymerization initiator is excessively low, the polymerization rate becomes slow, and a large amount of residual monomers may be extracted from the final product. Conversely, when the concentration of the polymerization initiator is higher than the above range, polymer chains forming a network are shortened, so that the extractable content increases and absorbency under pressure decreases, thereby lowering physical properties of the polymer.

The monomer mixture may further include an additive such as a thickener, a plasticizer, a preservation stabilizer, an antioxidant, and the like, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

In addition, the encapsulated foaming agent refers to a thermally expandable microcapsule foaming agent having a core-shell structure, and the core-shell structure has a core including a hydrocarbon and a shell formed of a thermoplastic resin on the core. Specifically, the hydrocarbon constituting the core is a liquid hydrocarbon having a low boiling point and is easily vaporized by heat. Therefore, when heat is applied to the encapsulated foaming agent, the thermoplastic resin constituting the shell is softened and the liquid hydrocarbon of the core is vaporized at the same time. In addition, as the pressure inside the capsule increases, the encapsulated foaming agent expands, and accordingly, bubbles having an increased size than the existing size are formed.

Accordingly, the encapsulated foaming agent generates hydrocarbon gas, and is distinguished from an organic foaming agent that generates nitrogen gas through an exothermic decomposition reaction between monomers participating in the production of a polymer, and an inorganic foaming agent that foams carbon dioxide gas by absorbing heat generated in the production of a polymer.

The encapsulated foaming agent may have different expansion characteristics depending on the components constituting the core and the shell, and the weight and diameter of each component. Therefore, the encapsulated foaming agent can be expanded to a desired size by adjusting them, thereby controlling the porosity of the super absorbent polymer.

Specifically, the encapsulated foaming agent has a particle shape having an average diameter ($D_0$) of 5 to 30 μm before expansion. It is difficult to manufacture the encapsulated foaming agent to have an average diameter of less than 5 μm. When the average diameter of the encapsulated foaming agent exceeds 30 μm, it may be difficult to efficiently increase the surface area because the size of pores is too large. Therefore, when the encapsulated foaming agent has the average diameter as described above, it can be determined that the encapsulated foaming agent is suitable for achieving an appropriate pore structure in the resin.

For example, the average diameter before expansion of the encapsulated foaming agent may be 5 μm or more, 6 μm or more, 7 μm or more, 8 μm or more, or 10 μm or more, and 30 μm or less, 25 μm or less, 20 μm or less, 17 μm or less, 16 μm or less, or 15 μm or less.

The average diameter ($D_0$) of the encapsulated foaming agent before expansion can be measured by measuring the diameter of each encapsulated foaming agent particle as an average Feret diameter with an optical microscope, and then obtaining an average value thereof.

In this case, a capsule thickness of the encapsulated foaming agent may be 2 to 15 μm.

In addition, the encapsulated foaming agent has a maximum expansion size in air of 20 to 190 μm. Herein, the "maximum expansion size of the encapsulated foaming agent" means a diameter range of the top 10 wt % of the highly expanded particles after applying heat to the encapsulated foaming agent. It is difficult to manufacture the encapsulated foaming agent such that the maximum expansion size in air is smaller than 20 μm, and when the maximum expansion size in air exceeds 190 μm, it may be difficult to efficiently increase the surface area because the size of pores is too large.

For example, the encapsulated foaming agent may have a maximum expansion size in air of 50 to 190 μm, 70 to 190 μm, 75 to 190 or 80 to 150 μm.

The maximum expansion size in air of the encapsulated foaming agent may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of the top 10 wt % of the highly expanded particles as an average Feret diameter with an optical microscope.

In addition, the encapsulated foaming agent has a maximum expansion ratio in air of 5 to 15 times. Herein, the "maximum expansion ratio of the encapsulated foaming agent" means a ratio ($D_M/D_0$) of the average diameter ($D_M$) of the top 10 wt % of the highly expanded particles after applying heat to the average diameter ($D_0$) of the encapsulated foaming agent measured before applying heat. When the maximum expansion ratio in air of the encapsulated foaming agent is less than 5 times, an appropriate pore structure cannot be formed in the super absorbent polymer, so there is a problem in that it is impossible to manufacture a super absorbent polymer with improved absorbency and absorption rate. It is difficult to manufacture the encapsulated foaming agent such that the maximum expansion ratio in air exceeds 15 times, considering the average diameter of the encapsulated foaming agent before expansion. Therefore, it can be determined that the encapsulated foaming agent having the maximum expansion ratio within the above range is suitable for forming a pore structure suitable for the super absorbent polymer.

For example, the maximum expansion ratio in air of the encapsulated foaming agent may be 5 times or more, 7 times or more, or 8 times or more, and 15 times or less, 13 times or less, 11 times or less, or 10 times or less.

At this time, the average diameter ($D_0$) of the encapsulated foaming agent measured before applying heat may be measured as described above. In addition, the average diameter ($D_M$) of the top 10 wt % of the highly expanded particles after applying heat may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of each of the top 10 wt % of the particles as an average Feret diameter with an optical microscope, and then obtaining an average value thereof.

The expansion characteristics of the encapsulated foaming agent may be further specified in Examples to be described later.

The reason for measuring the maximum expansion size and the maximum expansion ratio of the encapsulated foaming agent in air is to determine whether pores having a desired size are formed in the super absorbent polymer to be prepared using the encapsulated foaming agent. Specifically, the shape in which the foaming agent is foamed may vary depending on the preparation conditions of the super absorbent polymer, so it is difficult to define the foamed shape. Therefore, the expansion size and the expansion ratio are determined by first foaming the encapsulated foaming agent in air, and confirming whether the encapsulated foaming agent is suitable for forming the desired pores.

The hydrocarbon constituting the core of the encapsulated foaming agent may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane. Among them, the C3 to C5 hydrocarbons (n-propane, n-butane, iso-butane, cyclobutane, n-pentane, iso-pentane, cyclopentane) are suitable for forming pores having the above-mentioned size, and iso-butane may be most suitable.

In addition, the thermoplastic resin constituting the shell of the encapsulated foaming agent may be a polymer formed from at least one monomer selected from the group consisting of (meth)acrylate-based compounds, (meth)acrylonitrile-based compounds, aromatic vinyl-based compounds, vinyl acetate-based compounds, and halogenated vinyl-based compounds. Among them, a copolymer of (meth) acrylate and (meth)acrylonitrile may be most suitable for forming pores having the above-mentioned size.

In addition, the foaming start temperature ($T_{start}$) of the encapsulated foaming agent may be 60° C. to 120° C., 65° C. to 120° C., or 70° C. to 80° C., and the maximum foaming temperature ($T_{max}$) may be 100° C. to 160° C., 105° C. to 155° C., or 110° C. to 120° C. Within the above range, foaming may occur easily in a subsequent thermal polymerization process or drying process to introduce a pore structure in the polymer. The foaming start temperature and the foaming maximum temperature can be measured using a thermomechanical analyzer.

In addition, the encapsulated foaming agent may be used in an amount of 0.05 to 1 part by weight based on 100 parts by weight of the water-soluble ethylene-based unsaturated monomer. When the content of the foaming agent is less than 0.05 parts by weight, the effect of adding the foaming agent may be insignificant. When the content of the foaming agent exceeds 1 part by weight, there are too many pores in the cross-linked polymer, so that the extractable content and the BPI value may decrease due to increased tackiness of the hydrogel polymer. In addition, gel strength of the super absorbent polymer to be prepared decreases and the density also decreases, which may cause problems in distribution and storage. For example, the encapsulated foaming agent may be used in an amount of 0.05 parts by weight or more, 0.07 parts by weight or more, 0.09 parts by weight or more, or 0.1 parts by weight or more, and 0.8 parts by weight or less, 0.5 parts by weight or less, 0.3 parts by weight or less, or 0.2 parts by weight or less based on 100 parts by weight of the water-soluble ethylene-based unsaturated monomer.

In addition, a surfactant commonly used as a foam stabilizer may be further added together with the encapsulated foaming agent. For example, the foam stabilizer may include at least one compound selected from the group consisting of an alkyl sulfate-based compound and a polyoxyethylene alkyl ether-based compound. Examples of the alkyl sulfate-based compound include sodium dodecyl sulfate, ammonium lauryl sulfate, sodium lauryl ether sulfate, sodium myreth sulfate, and the like. Examples of the polyoxyethylene alkyl ether-based compound include polyoxyethylene lauryl ether. Herein, the alkyl sulfate-based compound is an anionic surfactant, and the polyoxyethylene alkyl ether-based compound is a nonionic surfactant.

Herein, the encapsulated foaming agent and the foam stabilizer may be used in a weight ratio of 1:0.01 to 1:0.5.

In addition, the carboxylic acid-based additive may be dry-mixed, dissolved in a solvent and then mixed, or melted and then mixed. For example, the additive may be mixed in the form of a solution dissolved in a solvent. At this time, any type of inorganic solvent or organic solvent may be used without limitation, but water is most preferable for the solvent in consideration of the ease of drying and the cost of solvent recovery system.

In addition, the carboxylic acid-based additive may be used in an amount of 0.01 to 10 parts by weight based on 100 parts by weight of the water-soluble ethylene-based unsaturated monomer. At this time, when the carboxylic acid-based additive is used in less than 0.01 parts by weight, it is not sufficient to reduce the surface tackiness of the hydrogel polymer. When the carboxylic acid-based additive is used in excess of 10 parts by weight, unreacted substances may occur due to foaming. More specifically, the carboxylic acid-based additive is preferably used in an amount of 0.05 parts by weight or more, or 0.1 parts by weight or more, and 2 parts by weight or less, 1 part by weight or less, 0.5 parts by weight or less, or 0.4 parts by weight or less based on 100 parts by weight of the water-soluble ethylene-based unsaturated monomer for minimizing the surface tackiness of the hydrogel polymer and not reducing the absorption performance of the super absorbent polymer.

Meanwhile, the cross-linking polymerization of a water-soluble ethylene-based unsaturated monomer having at least partially neutralized acidic groups may be performed without any particular limitation, as long as the hydrogel polymer can be formed by thermal polymerization, photopolymerization, or hybrid polymerization.

Specifically, the polymerization method is largely divided into thermal polymerization and photopolymerization depending on an energy source of the polymerization. In the case of thermal polymerization, it is generally carried out in a reactor equipped with an agitation spindle, such as a kneader. In the case of photopolymerization, it is generally carried out in a reactor equipped with a movable conveyor belt, or in a container with a flat bottom. However, the above-mentioned polymerization method is merely an example, and the present disclosure is not limited thereto.

For example, a hydrogel polymer may be obtained by supplying hot air to the reactor with an agitation spindle such as a kneader or heating the reactor to perform thermal polymerization. The hydrogel polymer thus obtained may have a size of several centimeters to several millimeters, according to the shape of the agitation spindle equipped in the reactor. Specifically, the size of the obtained hydrogel polymer may vary depending on the concentration and injection speed of the monomer composition injected thereto, and a hydrogel polymer having a weight average particle diameter of 2 to 50 mm may be obtained.

Further, when the photopolymerization is carried out in a reactor equipped with a movable conveyor belt or in a container with a flat bottom as described above, the obtained hydrogel polymer may be usually a sheet-like hydrogel polymer having a width of the belt. In this case, the thickness of the polymer sheet may vary depending on the concentration, injection speed or injection amount of the monomer composition to be injected, but usually, it is preferable to feed the monomer composition such that a sheet-like polymer having a thickness of about 0.5 to about 5 cm can be obtained. When the monomer mixture is fed such that the thickness of the sheet-like polymer becomes too thin, the production efficiency is low, which is undesirable. When the thickness of the sheet-like polymer is greater than 5 cm, the polymerization reaction cannot be evenly carried out over the entire thickness because of the excessive thickness.

At this time, the hydrogel polymer thus obtained may have a moisture content of 30 to 70 wt %. For example, the moisture content of the hydrogel polymer may be 35 wt % or more, 40 wt % or more, 45 wt % or more, or 50 wt % or more, and 70 wt % or less, 65 wt % or less, or 60 wt % or less. When the moisture content of the hydrogel polymer is too low, it is difficult to secure an appropriate surface area in the subsequent pulverization step, and thus the pulverization may not be effective. When the moisture content of the hydrogel polymer is too high, the pressure received in the subsequent pulverization step increases, and thus the pulverization may be difficult to proceed to a desired particle size.

Meanwhile, the "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated by the weight loss due to moisture evaporation from the polymer in the process of increasing the temperature of the crumb polymer for drying through infrared heating. At this time, the drying conditions for measuring the moisture content are as follows: the temperature is increased to about 180° C. and maintained at 180° C., and the total drying time is 40 min including 5 min of a heating step.

Meanwhile, a surface tackiness index (at 25° C.) of the hydrogel polymer measured according to the steps of 1) to 4) below may be 200 g or less:

1) preparing two specimens in which a hydrogel polymer having a bottom surface (surface in contact with a reaction vessel when preparing a hydrogel polymer) is cut to a size of 2.5 cm in width*2.5 cm in length*2 cm in thickness;

2) fixing each of the prepared two specimens to upper and lower holders of a texture analyzer, wherein the two specimens are fixed such that the bottom surface of the specimen protrudes out of each holder by 1 mm;
3) attaching the bottom surfaces of the two specimens by approaching the upper/lower holders to which the two specimens are fixed such that a distance between the holders becomes 1 mm, and then holding them for 5 seconds; and
4) measuring a maximum force (max force, g) when the parts to which the two specimens are attached fall off by pulling the upper holder, and taking this as a surface tackiness index.

At this time, the "bottom surface" of the hydrogel polymer refers to a surface that does not directly receive a light source for polymerization during polymerization, because it is in contact with the reaction vessel. Since this bottom surface usually has tackiness, it can be used to measure the tackiness index as described above.

Through such quantitative analysis of the surface tackiness index, the tackiness of the hydrogel polymer can be quantified, and the relationship between the surface tackiness of the hydrogel polymer and the extractable content can be understood. More specifically, the surface tackiness index of the hydrogel polymer may be 200 g or less, 180 g or less, 150 g or less, or 50 g or less. In addition, as the lower surface tackiness index can be evaluated as the better, the lower limit is theoretically 0 g, but may be 5 g or more, 10 g or more, or 20 g or more.

(Step 2)

The above step is a step of preparing a final super absorbent polymer by drying the prepared hydrogel polymer, and then pulverizing it to a normal particle size.

First, before drying the hydrogel polymer, a step of chopping or cutting the hydrogel polymer using a pulverizing machine may be performed.

At this time, the pulverizing machine used is not particularly limited, and any one selected from the group consisting of a vertical pulverizer, a turbo cutter, a turbo grinder, a rotary cutter mill, a cutter mill, a disc mill, a shred crusher, a crusher, a chopper, and a disc cutter may be used. However, the present disclosure is not limited thereto.

Among them, the chopping may be performed by a chopper, more specifically by a meat chopper. At this time, the meat chopper may include a chopping module having one or more perforated plates, and each perforated plate may be provided with a plurality of fine chopping holes having a certain size through which the hydrogel polymer can pass. In addition, a hole size of the fine chopping holes of the perforated plate may be 3 mm to 16 mm. In other words, it can be seen that the pulverization is performed by pushing the hydrogel polymer mixed with the additive such that the hydrogel polymer is pulverized while passing through the fine chopping holes of perforated plates. At this time, an extruder may be used to push out the hydrogel polymer. For example, a single- or multiple-screw extruder may be used.

Subsequently, the chopped hydrogel polymer is dried to remove moisture. Specifically, drying of the chopped hydrogel polymer may be performed such that the moisture content of each of the plurality of super absorbent polymer particles included in the prepared super absorbent polymer is about 10 wt % or less, specifically, about 0.01 to about 10 wt %.

Herein, the drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, fine powder may be generated in the subsequent pulverization process, and physical properties of the final super absorbent polymer may decrease. Therefore, the drying may preferably be performed at a temperature of about 150 to about 200° C., more preferably at a temperature of about 160 to about 180° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 5 to about 10 wt %.

Subsequently, a step of pulverizing the dried polymer obtained through the drying step is performed.

The base resin, which is a polymer powder obtained after the pulverization step, may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to manage the physical properties of the super absorbent polymer powder to be commercialized after the pulverization step, the base resin obtained after pulverization is classified according to particle size. Preferably, the polymer having a particle diameter of about 150 to about 850 μm is classified, and only the base resin having such a particle diameter may be subjected to a surface cross-linking reaction step. In this case, the particle diameter may be measured in accordance with the EDANA (European Disposables and Nonwovens Association) WSP 220.3.

(Surface Cross-Linking Step)

Thereafter, if necessary, a step of forming a surface cross-linked layer on at least a part of the surface of the super absorbent polymer particles in the presence of a surface cross-linking agent may be further included. By the above step, the cross-linked polymer included in the super absorbent polymer particles may be further cross-linked with a surface cross-linking agent, so that a surface cross-linked layer may be formed on at least a part of the surface of the super absorbent polymer particles.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like.

Specifically, one or more, two or more, or three or more of the above-mentioned surface cross-linking agents may be used as the surface cross-linking agent, for example, ethylene carbonate-propylene carbonate (ECPC), propylene glycol and/or glycerol carbonate may be used.

This surface cross-linking agent may be used in an amount of about 0.001 to about 5 parts by weight based on 100 parts by weight of the super absorbent polymer particles. For example, the surface cross-linking agent may be used in an amount of 0.005 parts by weight or more, 0.01 parts by weight or more, or 0.05 parts by weight or more, and 5 parts by weight or less, 4 parts by weight or less, or 3 parts by weight or less based on 100 parts by weight of the super absorbent polymer particles. By adjusting the content of the surface cross-linking agent within the above-described range, a super absorbent polymer having excellent absorption properties can be prepared.

In addition, the step of forming the surface cross-linked layer may be performed by adding an inorganic material to the surface cross-linking agent. That is, a step of further cross-linking the surface of the super absorbent polymer particles in the presence of the surface cross-linking agent and the inorganic material to form a surface cross-linked layer may be performed.

As the inorganic material, at least one inorganic material selected from the group consisting of silica, clay, alumina, silica-alumina composite, titania, zinc oxide and aluminum sulfate may be used. The inorganic material may be used in a powdery form or in a liquid form, and in particular, alumina powder, silica-alumina powder, titania powder, or nanosilica solution may be used. In addition, the inorganic material may be used in an amount of about 0.001 to about 1 parts by weight based on 100 parts by weight of the super absorbent polymer particles.

In addition, the method of mixing the surface cross-linking agent with the super absorbent polymer composition is not particularly limited. For example, a method of adding the surface cross-linking agent and the super absorbent polymer composition in a reactor for mixing, a method of spraying the surface cross-linking agent onto the super absorbent polymer composition, or a method of mixing the super absorbent polymer composition and the surface cross-linking agent while continuously providing them to a continuously operating mixer may be used.

When mixing the surface cross-linking agent and the super absorbent polymer composition, water and methanol may be further mixed therewith. When water and methanol are added thereto, there is an advantage that the surface cross-linking agent may be evenly dispersed in the super absorbent polymer composition. At this time, amounts of water and methanol to be added may be properly controlled for the purposes of inducing a uniform dispersion of the surface cross-linking agent, preventing an agglomeration phenomenon of the super absorbent polymer composition, and optimizing a surface penetration depth of the surface cross-linking agent.

The surface cross-linking process may be performed at a temperature of about 80° C. to about 250° C. More specifically, the surface cross-linking process may be performed at a temperature of about 100° C. to about 220° C., or about 120° C. to about 200° C., for about 20 minutes to about 2 hours, or about 40 minutes to about 80 minutes. When the above-described surface cross-linking conditions are satisfied, the surface of the super absorbent polymer particles is sufficiently cross-linked to increase absorbency under pressure.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

Hereinafter, the present invention will be described in more detail with reference to examples. However, these examples are for illustrative purposes only, and the invention is not intended to be limited by these examples.

EXAMPLES

Preparation of Encapsulated Foaming Agent

As an encapsulated foaming agent used in Examples, F-36D manufactured by Matsumoto, which has a core of iso-butane and a shell of a copolymer of acrylate and acrylonitrile, was prepared. At this time, the foaming start temperature ($T_{start}$) of the F-36D is 70° C. to 80° C., and the maximum foaming temperature ($T_{max}$) is 110° C. to 120° C.

The diameter of each encapsulated foaming agent was measured as an average Feret diameter with an optical microscope. Then, an average value of the diameters of the encapsulated foaming agents was obtained and defined as the average diameter of the encapsulated foaming agent.

In addition, in order to confirm expansion characteristics of the encapsulated foaming agent, 0.2 g of the encapsulated foaming agent prepared above was applied on a glass Petri dish, and then left on a hot plate preheated to 150° C. for 10 minutes. The encapsulated foaming agent expanded slowly by heat, and this was observed with an optical microscope to determine the maximum expansion ratio and maximum expansion size of the encapsulated foaming agent in air.

A diameter of the top 10 wt % of the highly expanded particles after applying heat to the encapsulated foaming agent was defined as the maximum expansion size, and a ratio ($D_M/D_0$) of the average diameter ($D_M$) of the top 10 wt % of the highly expanded particles after applying heat to the average diameter ($D_0$) measured before applying heat to the encapsulated foaming agent was defined as the maximum expansion ratio.

The average diameter of the prepared encapsulated foaming agent before expansion was 13 the maximum expansion ratio in air was about 9 times, and the maximum expansion size was about 80 to 150 μm.

Example 1

(Step 1)

100 g (1.388 mol) of acrylic acid, 0.001 g of polyethylene glycol diacrylate (Mn=508) as an internal cross-linking agent, 0.24 g of ethylene glycol diglycidyl ether, 0.008 g of diphenyl(2,4,6-trimethylbenzoyl)phosphine oxide as a photopolymerization initiator, 0.2 g of sodium persulfate as a thermal polymerization initiator, 123.5 g of 32% caustic soda solution, 0.1 g of encapsulated foaming agent (F-36D), 0.4 g of sodium stearoyl-2-lactylate (Almax-6900, manufactured by Ilshin Wells) represented by the following Chemical Formula 1-6, and 0.09 g of sodium dodecyl sulfate (SDS) aqueous solution were mixed with 59.0 g of water in a 3 L glass container equipped with a stirrer and a thermometer at room temperature to prepare a monomer composition having a total solid content of 45 wt % (degree of neutralization of acrylic acid: 70 mol %). At this time, the sodium stearoyl-2-lactylate was dissolved in water and then added.

[Chemical Formula 1-6]

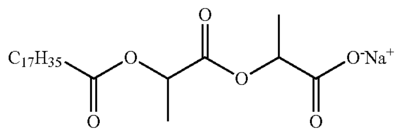

Thereafter, the monomer composition was supplied at 500 to 2000 mL/min on a conveyor belt in which a belt having a width of 10 cm and a length of 2 m rotates at a speed of 50 cm/min. At the same time as the monomer composition was supplied, ultraviolet rays having an intensity of 10 mW/cm$^2$ were irradiated to perform a polymerization reaction for 60 seconds, thereby obtaining a hydrogel polymer in the form of a sheet having a moisture content of 50 wt %.

(Step 2)

Subsequently, the hydrogel polymer obtained by the polymerization reaction was coarsely pulverized using a meat chopper such that the hydrogel polymer had a particle diameter of 300 μm to 5000 μm. As the meat chopper, a meat chopper including a perforated plate provided with a plurality of fine chopping holes having a hole size of 3 mm was used.

Thereafter, the pulverized product was dried by flowing hot air at 180° C. for 43 minutes using a convection oven capable of changing wind direction up and down to obtain a base resin in the form of powder. The obtained product was classified using ASTM standard mesh to prepare a super absorbent polymer having a particle size of 150 to 850 μm.

Example 2

A super absorbent polymer was prepared in the same manner as in Example 1, except that 0.15 g of the encapsulated foaming agent (F-36D) was used in Example 1.

Example 3

A super absorbent polymer was prepared in the same manner as in Example 1, except that 0.2 g of the encapsulated foaming agent (F-36D) was used in Example 1.

Example 4

A super absorbent polymer was prepared in the same manner as in Example 1, except that 0.1 g of sodium stearoyl-2-lactylate represented by Chemical Formula 1-6 was used in Example 1.

Example 5

A super absorbent polymer was prepared in the same manner as in Example 1, except that monolauryl maleate represented by the following Chemical Formula 1-1 was used instead of the sodium stearoyl-2-lactylate. Herein, the monolauryl maleate represented by the following Chemical Formula 1-1 was prepared by mixing maleic acid anhydride and 1-dodecanol in a molar ratio of 1:1, followed by reacting at 60° C. for 3 hours.

[Chemical Formula 1-1]

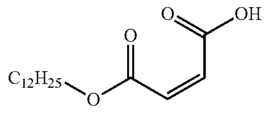

Example 6

A super absorbent polymer was prepared in the same manner as in Example 1, except that monostearyl maleate represented by the following Chemical Formula 1-4 was used instead of the sodium stearoyl-2-lactylate. Herein, the monostearyl maleate represented by the following Chemical Formula 1-4 was prepared by mixing maleic acid anhydride and stearyl alcohol in a molar ratio of 1:1, followed by reacting at 80° C. for 3 hours.

[Chemical Formula 1-4]

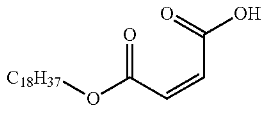

Example 7

A super absorbent polymer was prepared in the same manner as in Example 1, except that monolauryl succinate represented by the following Chemical Formula 1-5 was used instead of the sodium stearoyl-2-lactylate. Herein, the monolauryl succinate represented by the following Chemical Formula 1-5 was prepared by mixing succinic acid anhydride and 1-dodecanol in a molar ratio of 1:1, followed by reacting at 110° C. for 3 hours.

[Chemical Formula 1-5]

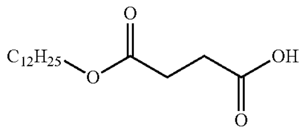

Comparative Example 1

A super absorbent polymer was prepared in the same manner as in Example 1, except that sodium stearoyl-2-lactylate was not used in Example 1.

Comparative Example 2

A super absorbent polymer was prepared in the same manner as in Example 1, except that sodium stearoyl-2-lactylate was not used and 0.15 g of the encapsulated foaming agent (F-36D) was used in Example 1.

Comparative Example 3

A super absorbent polymer was prepared in the same manner as in Example 1, except that sodium stearoyl-2-lactylate was not used and 0.2 g of the encapsulated foaming agent (F-36D) was used in Example 1.

Comparative Example 4

An attempt was made to prepare a super absorbent polymer in the same manner as in Example 1, except for using sodium stearate instead of sodium stearoyl-2-lactylate. However, it was insoluble in water and not miscible with the monomer composition, and thus a super absorbent polymer could not be prepared in the same manner as in Example 1.

Test Example 1

The centrifuge retention capacity (CRC), absorbency under pressure (AUP), vortex time, permeability and anti-caking efficiency of the super absorbent polymers prepared in Examples and Comparative Examples were evaluated in the following manner, and the results are shown in Table 1 below. Unless otherwise indicated, all procedures were conducted in a constant temperature and humidity room (23±2° C., relative humidity of 45±10%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity by absorption ratio under a non-loading condition of each polymer composition was measured according to the EDANA (European Disposables and Nonwovens Association) WSP 241.3 method.

Specifically, a polymer composition was obtained by classifying each of the polymer compositions prepared in Examples and Comparative Examples through a sieve of #30-50. After inserting $W_0$ (g, about 0.2 g) of the polymer composition uniformly in a nonwoven fabric envelope and sealing the same, it was soaked in saline (0.9 wt %) at room temperature. After 30 minutes, the envelope was centrifuged at 250G for 3 minutes to drain, and the weight $W_2$ (g) of the envelope was measured. Further, after carrying out the same operation without using the resin, the weight $W_1$ (g) of the envelope was measured.

Then, CRC (g/g) was calculated by using the obtained weight values according to the following Equation 1.

$$\text{CRC } (g/g)=\{[W_2(g)-W_1(g)]/W_0(g)\}-1 \quad \text{[Example 1]}$$

(2) Extractable Content (E/C)

The classified (#40-50) super absorbent polymer particles among the super absorbent polymers of Examples and Comparative Examples were used as a sample. The sample was swelled for 1 hour, and then the extractable content was measured according to the EDANA WSP 270.2 method.

Specifically, 1.0 g of the super absorbent polymer classified using ASTM standard mesh #40-50 was placed in 200 g of 0.9 wt % NaCl solution and allowed to freely swell for 1 hour while stirring at 500 rpm, followed by filtering the aqueous solution with a filter paper. The filtered solution was first titrated to pH 10.0 with 0.1 N caustic soda solution, and then back titrated to pH 2.7 with 0.1 N hydrogen chloride solution. Using the amount required for neutralization, the non-cross-linked polymer material was calculated and measured as the extractable content.

(3) BPI (Base Polymer Index)

The BPI value of the super absorbent polymers of Examples and Comparative Examples was obtained according to Equation 1 below using the CRC and extractable content obtained above. In this case, the obtained value was rounded off to two decimal places.

$$BPI = \frac{CRC + 8.7585}{\ln\text{ (extractable content)}} \quad \text{[Equation 1]}$$

(4) Surface Tackiness Index (Quantitative Analysis of Surface Tackiness)

The surface tackiness index (at 25° C.) of the hydrogel polymer prepared in step 1 of the super absorbent polymer of Examples and Comparative Examples was measured according to the steps of 1) to 4) below. Herein, one super absorbent polymer was repeatedly measured three times with a separate specimen, and then an average value thereof was obtained.

1) Two specimens in which a hydrogel polymer having a bottom surface (surface in contact with a reaction vessel when preparing a hydrogel polymer) was cut to a size of 2.5 cm in width*2.5 cm in length*2 cm in thickness were prepared.

2) Each of the prepared two specimens was fixed to upper and lower holders of a texture analyzer. Herein, the two specimens were fixed such that the bottom surface of the specimen protrudes out of each holder by 1 mm.

3) The bottom surfaces of the two specimens were attached by approaching the upper/lower holders to which the two specimens were fixed such that a distance between the holders became 1 mm, and then held for 5 seconds.

4) A maximum force (max force, g) when the parts to which the two specimens were attached fell off by pulling the upper holder was measured, and taken as a surface tackiness index.

(5) Analysis of surface tackiness (Qualitative analysis of surface tackiness)

When the hydrogel polymer prepared in Step 1 of the super absorbent polymer of Examples and Comparative Examples was touched by hand, if there was no tackiness, it was indicated as "X", if there was a little tackiness, it was indicated as "Δ", and if there was a lot of tackiness, it was indicated as "○".

TABLE 1

| | Additive content1) | Encapsulated foaming agent content2) | Analysis of surface tackiness of hydrogel polymer: Qualitative analysis | Analysis of surface tackiness of hydrogel polymer: Quantitative analysis (force, g) | Physical properties of super absorbent polymer: CRC (g/g) | Physical properties of super absorbent polymer: E/C (wt %) | Physical properties of super absorbent polymer: BPI |
|---|---|---|---|---|---|---|---|
| Example 1 | 0.4 | 0.1 | X | 28 | 35.0 | 3.3 | 36.7 |
| Example 2 | 0.4 | 0.15 | X | 30 | 34.7 | 3.3 | 36.4 |
| Example 3 | 0.4 | 0.2 | Δ | 35 | 34.8 | 3.4 | 35.6 |
| Example 4 | 0.1 | 0.1 | Δ | 154 | 35.1 | 3.7 | 33.5 |
| Example 5 | 0.4 | 0.1 | X | 30 | 34.9 | 3.3 | 36.6 |
| Example 6 | 0.4 | 0.1 | X | 29 | 35.0 | 3.3 | 36.7 |
| Example 7 | 0.4 | 0.1 | X | 31 | 34.8 | 3.3 | 36.5 |
| Comparative Example 1 | — | 0.1 | Δ | 219 | 34.3 | 4.2 | 30.0 |

TABLE 1-continued

| | | Encapsulated foaming | Analysis of surface tackiness of hydrogel polymer | | Physical properties of super absorbent polymer | | |
|---|---|---|---|---|---|---|---|
| | Additive content[1)] | agent content[2)] | Qualitative analysis | Quantitative analysis (force, g) | CRC (g/g) | E/C (wt %) | BPI |
| Comparative Example 2 | — | 0.15 | ○ | 366 | 34.7 | 4.3 | 29.8 |
| Comparative Example 3 | — | 0.2 | ○ | 401 | 34.4 | 4.6 | 28.3 |

[1)]in parts by weight based on 100 parts by weight of acrylic acid
[2)]in parts by wieght based on 100 parts by wieght of acrylic acid Referring to Table 1 above, the super absorbent polymers of Examples including the carboxylic acid represented by the Chemical Formula 1 or a salt thereof significantly reduced tackiness of the hydrogel polymer during the manufacturing process compared to the super absorbent polymers of Comparative Examples, and thus exhibited an extractable content of 4 wt % or less and a BPI (Base Polymer Index) value of 31 or more based on the total weight of the super absorbent polymer.

The invention claimed is:

1. A super absorbent polymer comprising super absorbent polymer particles comprising a cross-linked polymer of a water-soluble ethylene-based unsaturated monomer having at least partially neutralized acidic groups and an internal cross-linking agent; and a carboxylic acid-based additive, wherein the carboxylic acid-based additive comprises at least one selected from the group consisting of a carboxylic acid represented by Chemical Formula 1 and a salt thereof, and the super absorbent polymer satisfies physical properties of:

1) An extractable content measured after swelling the super absorbent polymer for 1 hour according to EDANA WSP 270.2 is 4 wt % or less based on a total weight of the super absorbent polymer; and 2) Base Polymer Index (BPI) calculated according to Equation 1 is 31 or more:

Chemical Formula 1

$$A\!-\!\left(B_1-B_2\right)_n\!-\!C$$

wherein in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH═CH—, or —C≡C—, $R_1$ and $R_2$ are each independently C1 to C4 alkyl, n is an integer of 1 to 3, and C is a carboxyl group, Equation 1

$$BPI = \frac{CRC + 8.7585}{\ln\ (\text{extractable content})}$$

wherein in Equation 1,

CRC is centrifuge retention capacity measured according to the EDANA WSP 241.3, and ln (extractable content) is a natural log value of the extractable content.

2. The super absorbent polymer of claim 1, wherein in Chemical Formula 1, A is —$C_6H_{13}$, —$C_{11}H_{23}$, —$C_{12}H_{25}$, —$C_{17}H_{35}$, or —$C_{18}H_{37}$.

3. The super absorbent polymer of claim 1, wherein in Chemical Formula 1, B is

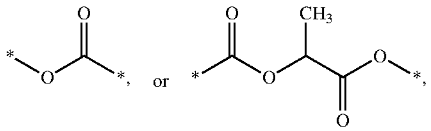

wherein * is a bonding site with a neighboring atom.

4. The super absorbent polymer of claim 1, wherein in Chemical Formula 1, $B_2$ is

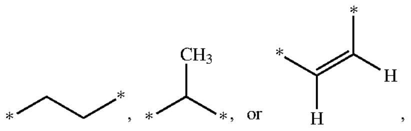

wherein * is a bonding site with a neighboring atom.

5. The super absorbent polymer of claim 1, wherein the carboxylic acid-based additive comprises at least one selected from the group consisting of a carboxylic acid represented by the Chemical Formula 1, an alkali metal salt thereof, and an alkaline earth metal salt thereof.

6. The super absorbent polymer of claim 1, wherein the carboxylic acid-based additive comprises any one of compounds represented by Chemical Formulae 1-1 to 1-7:

1-1

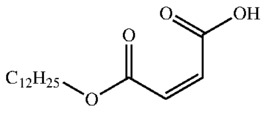

-continued 1-2

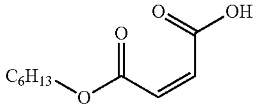

1-3

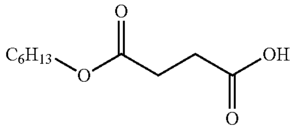

1-4

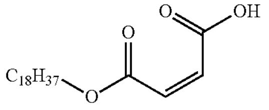

1-5

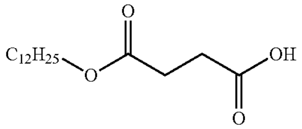

1-6

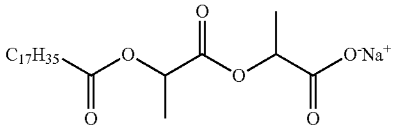

1-7

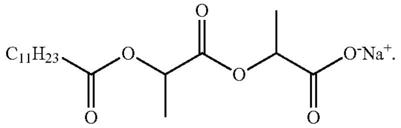

7. The super absorbent polymer of claim 1, further comprising a surface cross-linked layer cross-linking to the cross-linked polymer with a surface cross-linking agent on at least a part of a surface of the super absorbent polymer particles.

8. A method of preparing the super absorbent polymer according to claim 1, comprising forming a hydrogel polymer by cross-linking polymerization of a water-soluble ethylene-based unsaturated monomer having at least partially neutralized acidic groups in the presence of an internal cross-linking agent, an encapsulated foaming agent, a carboxylic acid-based additive and a polymerization initiator; and drying and pulverizing the hydrogel polymer, wherein the carboxylic acid-based additive comprises at least one selected from the group consisting of a carboxylic acid represented by Chemical Formula 1 and a salt thereof:

Chemical Formula 1

$$A\text{—}\!\left(B_1\text{—}B_2\right)_n\text{—}C$$

wherein in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH═CH—, or —C≡C—, $R_1$ and $R_2$ are each independently C1 to C4 alkyl, n is an integer of 1 to 3, and C is a carboxyl group.

9. The method of claim 8, wherein the encapsulated foaming agent has a structure having a core comprising a hydrocarbon and a shell formed of a thermoplastic resin surrounding the core.

10. The method of claim 9, wherein the hydrocarbon comprises at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane, and the thermoplastic resin comprises a polymer formed from at least one monomer selected from the group consisting of a (meth)acrylate-based compound, a (meth) acrylonitrile-based compound, an aromatic vinyl-based compound, a vinyl acetate-based compound and a halogenated vinyl-based compound.

11. The method of claim 8, wherein the encapsulated foaming agent has an average diameter before expansion of 5 to 30 μm, and a maximum expansion ratio in air of 5 to 15 times.

12. The method of claim 8, wherein the encapsulated foaming agent is used in an amount of 0.05 to 1 part by weight based on 100 parts by weight of the water-soluble ethylene-based unsaturated monomer.

13. The method of claim 8, wherein the carboxylic acid-based additive is used in an amount of 0.01 to 10 parts by weight based on 100 parts by weight of the water-soluble ethylene-based unsaturated monomer.

14. The method of claim 8, wherein a surface tackiness index (at 25° C.) of the hydrogel polymer measured according to 1) to 4) below is 200 g or less:

1) Preparing two specimens in which a hydrogel polymer having a bottom surface (surface in contact with a reaction vessel when preparing a hydrogel polymer) is cut to a size of 2.5 cm in width*2.5 cm in length*2 cm in thickness;

2) Fixing each of the prepared two specimens to upper and lower holders of a texture analyzer, wherein the two specimens are fixed such that the bottom surface of the specimen protrudes out of each holder by 1 mm;

3) Attaching the bottom surfaces of the two specimens by approaching the upper/lower holders to which the two specimens are fixed such that a distance between the holders becomes 1 mm, and then holding them for 5 seconds; and 4) Measuring a maximum force (max force, g) when the parts to which the two specimens are attached fall off by pulling the upper holder, and taking this as a surface tackiness index.

15. The method of claim 8, further comprising forming a surface cross-linked layer on at least a part of the surface of the prepared super absorbent polymer particles in the presence of a surface cross-linking agent.

* * * * *